(12) United States Patent
Lin

(10) Patent No.: US 12,022,901 B2
(45) Date of Patent: Jul. 2, 2024

(54) SILICONE DIPPED GLOVE AND DIPPING PROCESS THEREOF

(71) Applicant: Huihong (Nantong) Safety Products Co.,Ltd., Jiangsu (CN)

(72) Inventor: Xin Lin, Jiangsu (CN)

(73) Assignee: Huihong (Nantong) Safety Products Co., Ltd., Jiangsu (CN)

( * ) Notice: Subject to any disclaimer, the term of this patent is extended or adjusted under 35 U.S.C. 154(b) by 1031 days.

(21) Appl. No.: 16/960,316

(22) PCT Filed: Mar. 31, 2020

(86) PCT No.: PCT/CN2020/082393
§ 371 (c)(1),
(2) Date: Jul. 6, 2020

(87) PCT Pub. No.: WO2020/228434
PCT Pub. Date: Nov. 19, 2020

(65) Prior Publication Data
US 2021/0401097 A1 Dec. 30, 2021

(30) Foreign Application Priority Data
May 15, 2019 (CN) .......................... 201910404774.3

(51) Int. Cl.
| | | |
|---|---|---|
| *A41D 19/00* | (2006.01) |
| *B29C 41/00* | (2006.01) |
| *B29C 41/14* | (2006.01) |
| *B29C 41/34* | (2006.01) |
| *B29K 83/00* | (2006.01) |
| *B29L 31/48* | (2006.01) |
| *D06N 3/00* | (2006.01) |
| *D06N 3/12* | (2006.01) |

(52) U.S. Cl.
CPC ..... *A41D 19/0065* (2013.01); *A41D 19/0006* (2013.01); *B29C 41/003* (2013.01); *B29C 41/14* (2013.01); *B29C 41/34* (2013.01); *D06N 3/0006* (2013.01); *D06N 3/0038* (2013.01); *D06N 3/0068* (2013.01); *D06N 3/128* (2013.01); *B29K 2083/00* (2013.01); *B29L 2031/4864* (2013.01)

(58) Field of Classification Search
None
See application file for complete search history.

(56) References Cited

U.S. PATENT DOCUMENTS

2018/0125131 A1* 5/2018 Lee .................... A41D 19/0082

FOREIGN PATENT DOCUMENTS

| CN | 103923466 | 8/2016 |
| CN | 106738548 | 5/2017 |
| CN | 108991634 | 12/2018 |

OTHER PUBLICATIONS https://www.knipidee.nl/blog/knitted-vs.-woven-fabrics (Year: 2021).*

* cited by examiner

*Primary Examiner* — Arti Singh-Pandey
(74) *Attorney, Agent, or Firm* — JCIP GLOBAL INC.

(57) ABSTRACT

Disclosed is a silicone dipped glove, comprising a glove core and a dipping layer. The dipping layer is a silicone mixed compound layer, and the silicone mixed compound layer is composed of the following components at the following proportions by weight: 70-90% of silicone, 5-20% of a curing agent, 5-20% of a diluent, and 0-10% of a color paste. The silicone mixed compound layer of the present invention is composed of silicone, a curing agent and a diluent.

6 Claims, No Drawings

SILICONE DIPPED GLOVE AND DIPPING PROCESS THEREOF

CROSS-REFERENCE TO RELATED APPLICATION

This application is a 371 of international application of PCT application serial no. PCT/CN2020/082393, filed on Mar. 31, 2020, which claims the priority benefit of China application no. 201910404774.3, filed on May 15, 2019. The entirety of each of the above mentioned patent applications is hereby incorporated by reference herein and made a part of this specification.

FIELD OF THE INVENTION

The present invention relates to a labor protection glove, and more particularly to a dipped glove dipped with silicone on the surface and a dipping process thereof.

BACKGROUND OF THE INVENTION

Silicone gloves (particularly, labor protection gloves) have the characteristics of wear resistance, slip resistance, and high and low temperature resistance, and are often used by workers in special environments. Most of the silicone gloves are provided with a layer of silicone pads at a specific part of a glove core or liner layer by heat sealing or sewing. For example, a multi-layer glove is disclosed in Chinese Patent CN108991634A. Although such a silicone glove plays a very good protective role, the overall thickness of the glove is relatively thick, especially at the part with silicone pads, which makes it very inflexible for a wearer to operate.

As technology advances, some domestic labor protection glove manufacturers in China are also trying to make silicone gloves by dipping, gluing or smearing. For example, a method for producing a silicone glove is disclosed in Chinese Patent CN106738548A.

This method has the problems of poor bonding between a silicone layer and a glove core or liner layer and being easy to peel off. For another example, a method for producing a silicone glove is disclosed in Chinese Patent CN103923466B. This method uses a dipping process, which overcomes the problem of poor bonding. However, during dipping, silicone fluid easily penetrates into the glove core or liner layer, which affects the comfort of a wearer. In addition, the produced glove has poor softness.

Therefore, there is a need for a new technical solution to solve the above-mentioned technical problems.

SUMMARY OF THE INVENTION

The object of the present invention is to provide a new silicone formula and a new dipping process for a silicone dipped glove. The silicone glove thus produced not only has good softness, but also has very strong bonding between a silicone mixed compound layer and a glove core or liner layer to the extent that the peeling strength is up to 12N/mm. In addition, silicone fluid would not penetrate into the glove core or liner layer during the dipping process.

The present invention adopts the following technical solutions:

a silicone dipped glove, including a glove core or liner layer and a dipping layer, wherein the dipping layer is a silicone mixed compound layer, and the silicone mixed compound layer is composed of the following components at the following proportions by weight: 70-90% of silicone, 5-20% of a curing agent, 5-20% of a diluent, and 0-10% of a color paste.

The glove core or liner layer is woven from a single yarn from nylon, polyester, acrylic, cotton yarn, bamboo fiber, and tencel, or woven from a blended yarn from nylon and spandex, polyester and spandex, acrylic and spandex, cotton yarn and spandex, bamboo fiber and spandex, and tencel and spandex.

Preferably, the glove core or liner layer is woven from ultra-high molecular weight polyethylene fiber and nylon yarn, polyester yarn, acrylic yarn, cotton yarn, bamboo fiber yarn or tencel yarn and spandex auxiliary yarn.

Preferably, the glove core or liner layer is woven from aramid fiber yarn and nylon yarn, polyester yarn, acrylic yarn, cotton yarn, bamboo fiber or tencel yarn and spandex auxiliary yarn.

Preferably, glass fiber, basalt fiber, steel wire, or tungsten wire is further added during the glove core or liner layer weaving process.

A dipping process for a silicone dipped glove, wherein the glove core or liner layer is pretreated and immersed in the compound of the silicone mixed compound layer, and then subjected to dispensing, spin coating and baking steps to obtain the silicone dipped glove. The glove core or liner layer pretreatment step is specifically: a pretreatment solution is uniformly sprayed on a part of the glove core or liner layer to be dipped according to the requirements of the dipped part, and the glove core or liner layer sprayed with the pretreatment solution is soaked in water at 40-60° C. for 5-10 min, before the dipping step is performed.

The pretreatment solution is composed of the following components at the following proportions by weight: 70-80% of vinyl-terminated polydimethylsiloxane, 5-10% of a silane coupling agent, 5-10% of octamethylcyclotetrasiloxane, 1-3% of a metal catalyst, 5-10% of water, and 0-2% of a color paste.

Preferably, the metal catalyst is a Karstedt catalyst.

Preferably, the temperature of the sprayed pretreatment solution is 40-60° C.

The silicone mixed compound layer of the present invention is composed of silicone, a curing agent and a diluent. When silicone, the curing agent and the diluent are mixed per the above specific proportions, the resulting compound has good flowability and is easy to be adsorbed on the glove core or liner layer, and thus it bonds firmly with the glove core or liner layer after being cured. The rubber surface is light, soft and highly transparent. By adding a certain amount of a color paste according to the color requirements, different colors of rubber surface can be produced. The rubber surface has strong 3D feeling and the glove has a good aesthetic appearance.

The glove core or liner layer is pre-treated before being dipped, that is, the pretreatment solution is sprayed on the glove core or liner layer, and the sprayed glove core or liner layer is soaked in warm water, such that a film of the pretreatment solution is formed on the surface of the glove core or liner layer with the film firmly adsorbed on the glove core or liner layer. During dipping, a certain chemical reaction occurs between the silicone mixed compound and the film. The silicone mixed compound layer and the film are organically bonded together by chemical bonds, that is, the cured silicone mixed compound layer forms an integrated structure with the film. In this way, the bonding between the rubber surface and the glove core or liner layer is firmer. Also, the formed film can prevent silicone fluid from penetrating into the glove core or liner layer, thereby improving the dipping quality. In addition, the color paste added in the pretreatment solution can produce different colors of film. The silicone gloves thus produced are not only colored on the rubber surface, but also colored on the bottom layer (i.e., the film) of the rubber surface. The colors of both the rubber surface and the bottom layer of the rubber surface may be the same or may be different, and thus such silicone gloves have a good aesthetic appearance with rich colors.

DETAILED DESCRIPTION OF THE INVENTION

Example 1

Preparation of a silicone mixed compound layer: 8 Kg of silicone was placed in a batching kettle, and then 1 Kg of a curing agent, 0.8 Kg of 2-methyl silicone oil and 0.2 Kg of a color paste were added. The components were uniformly mixed to obtain a dipping material. The curing agent was formed by mixing ethyl orthosilicate and dibutyltin dilaurate in a weight ratio of 4:1.

Example 2

Preparation of a silicone mixed compound layer: 9 Kg of silicone was placed in a batching kettle, and then 0.5 Kg of a curing agent and 0.5 Kg of 2-methyl silicone oil were added. The components were uniformly mixed to obtain a dipping material. The curing agent was formed by mixing ethyl orthosilicate and dibutyltin dilaurate in a weight ratio of 5:1.

Example 3

Preparation of a silicone mixed compound layer: 7 Kg of silicone was placed in a batching kettle, and then 2 Kg of a curing agent, 0.5 Kg of 2-methyl silicone oil and 0.5 Kg of a color paste were added. The components were uniformly mixed to obtain a dipping material. The curing agent was formed by mixing ethyl orthosilicate and dibutyltin dilaurate in a weight ratio of 4:1.

Example 4

Preparation of a pretreatment solution: 7 Kg of vinyl terminated polydimethylsiloxane, 1 Kg of a silane coupling agent, 1 Kg of octamethylcyclotetrasiloxane, 0.1 Kg of a Karstedt catalyst, 0.7 Kg of water, and 0.2 Kg of a color paste were uniformly mixed, and then was heated to 40° C. and kept at this temperature for use.

Example 5

Preparation of a pretreatment solution: 8 Kg of vinyl-terminated polydimethylsiloxane, 0.9 Kg of a silane coupling agent, 0.5 Kg of octamethylcyclotetrasiloxane, 0.1 Kg of a Karstedt catalyst, and 0.5 Kg of a water-based color paste were uniformly mixed, and then were heated to 40° C. and kept at this temperature for use.

Example 6

Preparation of a pretreatment solution: 7 Kg of vinyl-terminated polydimethylsiloxane, 0.5 Kg of a silane coupling agent, 1 Kg of octamethylcyclotetrasiloxane, 0.3 Kg of a Karstedt catalyst, 1 Kg of water, and 0.2 Kg of a color paste were uniformly mixed, and then was heated to 50° C. and kept at this temperature for use.

Example 7

A 15-pin nylon glove core or liner layer was selected. Firstly, a hand mold was preheated to 50° C., and the glove core or liner layer was put on the hand mold and kept at this temperature for 4 min. Then, a part of the glove core or liner layer to be dipped was sprayed with a pretreatment solution, and then was soaked in water at 50° C. for 8 min, dipped in a dipping tank for 1s, subjected to dispensing and spin coating in the dipping tank for 2 min and 4 min respectively, and then baked at 90° C. for 50 min, and finally was cooled and demolded to obtain a silicone product. The pretreatment solution in Example 4 was used, and the dipping material in Example 1 was used.

Example 8

The pretreatment solution in Example 5 was used, the dipping material in Example 2 was used, and the other steps were the same as those in Example 7.

Example 9

The pretreatment solution in Example 6 was used, the dipping material in Example 3 was used, and the other steps were the same as Example 7.

Comparative Example 1

A A 15-pin nylon glove core or liner layer was selected. Firstly, a hand mold was preheated to 50° C., and the glove core or liner layer was put on the hand mold and kept at this temperature for 4 min. Then, a part of the glove core or liner layer to be dipped was sprayed with a pretreatment solution, and then was dipped in a dipping tank for 1s, subjected to dispensing and spin coating in the dipping tank for 2 min and 4 min respectively, and then baked at 90° C. for 50 min, and finally was cooled and demolded to obtain a silicone product. The pretreatment solution in Example 4 was used, and the dipping material in Example 1 was used.

Comparative Example 2

The pretreatment solution in Example 5 was used, the dipping material in Example 2 was used, and the other steps were the same as those in Comparative example 1.

Comparative Example 3

The pretreatment solution in Example 6 was used, the dipping material in Example 3 was used, and the other steps were the same as those in Comparative example 1.

The dipping layers of the gloves prepared in Examples 7-9 and Comparative Examples 1-3 described above had the same thickness. The peeling strength of the rubber surfaces of the gloves of Examples 7-9 and Comparative Examples 1-3 were tested:

| Serial No. | Thickness of | Peeling Strength of | Color of Rubber Surface |
|---|---|---|---|
| Example 7 | 0.3 mm | 12 N/mm | two-color |
| Example 8 | 0.3 mm | 13 N/mm | one-color |
| Example 9 | 0.3 mm | 13 N/mm | two-color |

-continued

| Serial No. | Thickness of | Peeling Strength of | Color of Rubber Surface |
|---|---|---|---|
| Comparative | 0.3 mm | 10 N/mm | two-color |
| Comparative | 0.3 mm | 9 N/mm | one-color |
| Comparative | 0.3 mm | 10 N/mm | two-color |

What is claimed is:

1. A silicone dipped glove, comprising a glove core or liner layer and a dipping layer,
wherein the glove core or liner layer is a woven weave, the dipping layer is a silicone mixed compound layer, and the silicone mixed compound layer is composed of the following components at the following proportions by weight:
70-90% of silicone,
5-20% of a curing agent,
5-20% of a diluent, and
0-10% of a color paste.

2. A dipping process for a silicone dipped glove, wherein the glove core or liner layer according to claim 1 is pretreated and immersed in the compound of the silicone mixed compound layer, and then subjected to dispensing, spin coating and baking steps to obtain the silicone dipped glove.

3. The dipping process for a silicone dipped glove according to claim 2, wherein the glove core or liner layer pretreatment step is specifically: a pretreatment solution is uniformly sprayed on a part of the glove core or liner layer to be dipped according to the requirements of the dipped part, and the glove core or liner layer sprayed with the pretreatment solution is soaked in water at 40-60° C. for 5-10 min, before the dipping step is performed.

4. The dipping process for a silicone dipped glove according to claim 3, wherein the pretreatment solution is composed of the following components at the following proportions by weight:
70-80% of vinyl-terminated polydimethylsiloxane,
5-10% of a silane coupling agent,
5-10% of octamethylcyclotetrasiloxane,
1-3% of a metal catalyst,
5-10% of water, and
0-2% of a color paste.

5. The dipping process for a silicone dipped glove according to claim 4, wherein the metal catalyst is a Karstedt catalyst.

6. The dipping process for a silicone dipped glove according to claim 2, wherein the temperature of the sprayed pretreatment solution is 40-60° C.

* * * * *